(12) United States Patent
Aston et al.

(10) Patent No.: US 10,265,930 B2
(45) Date of Patent: Apr. 23, 2019

(54) SPACECRAFT AND SPACECRAFT PROTECTIVE BLANKETS

(71) Applicant: The Boeing Company, Huntington Beach, CA (US)

(72) Inventors: Richard W. Aston, Brea, CA (US); Anna Maria Tomzynska, Seal Beach, CA (US); Eric S. Mindock, Playa del Rey, CA (US)

(73) Assignee: The Boeing Company, Chicago, IL (US)

(*) Notice: Subject to any disclaimer, the term of this patent is extended or adjusted under 35 U.S.C. 154(b) by 768 days.

(21) Appl. No.: 14/595,019

(22) Filed: Jan. 12, 2015

(65) Prior Publication Data

US 2016/0200460 A1 Jul. 14, 2016

(51) Int. Cl.
*B32B 5/00* (2006.01)
*B32B 5/26* (2006.01)
(Continued)

(52) U.S. Cl.
CPC ............... *B32B 5/26* (2013.01); *B32B 5/024* (2013.01); *B32B 5/028* (2013.01); *B32B 5/06* (2013.01); *B32B 15/14* (2013.01); *B32B 37/16* (2013.01); *B64G 1/52* (2013.01); *B64G 1/546* (2013.01); *B64G 1/56* (2013.01);
(Continued)

(58) Field of Classification Search
CPC .. B32B 5/00; B32B 5/26; B32B 5/024; B32B 5/028; B32B 5/06; B32B 15/00; B32B 15/14; B32B 37/00; B32B 37/16

USPC .............. 977/742–752; 428/411.1, 412, 903; 244/171.1
See application file for complete search history.

(56) References Cited

U.S. PATENT DOCUMENTS 4,489,906 A * 12/1984 Fellas ..................... B29C 71/04
244/1 A
4,923,741 A * 5/1990 Kosmo .............. A41D 31/0027
428/328

(Continued)

FOREIGN PATENT DOCUMENTS

EP      1 529 857         5/2005
KR    2013-0043788        5/2013
(Continued)

OTHER PUBLICATIONS

English translation of patent document KR 20130043788.*
(Continued)

*Primary Examiner* — Tien Q Dinh
*Assistant Examiner* — Aaron M Rodziwicz
(74) *Attorney, Agent, or Firm* — DASCENZO Intellectual Property Law, P.C.

(57) ABSTRACT

Protective blankets include a plurality of sheets of material operatively coupled together to define the protective blanket. The plurality of sheets includes at least one sheet composed of carbon nanotube reinforced composite material and at least one sheet composed of a different material. Methods of assembling protective blankets include layering the plurality of sheets and operatively coupling together the plurality of sheets. Spacecraft include a body and a protective blanket operatively coupled to the body. Methods of assembling spacecraft include coupling a protective blanket to the body of a spacecraft.

22 Claims, 3 Drawing Sheets

(51) Int. Cl.
  *B32B 37/16* (2006.01)
  *B32B 5/02* (2006.01)
  *B32B 5/06* (2006.01)
  *B32B 15/14* (2006.01)
  *B64G 1/52* (2006.01)
  *B64G 1/54* (2006.01)
  *B64G 1/56* (2006.01)

(52) U.S. Cl.
  CPC ... *B32B 2260/021* (2013.01); *B32B 2260/023* (2013.01); *B32B 2260/046* (2013.01); *B32B 2262/02* (2013.01); *B32B 2262/0269* (2013.01); *B32B 2262/106* (2013.01); *B32B 2264/108* (2013.01); *B32B 2307/212* (2013.01); *B32B 2307/304* (2013.01); *B32B 2307/558* (2013.01); *B32B 2571/00* (2013.01)

(56) References Cited

U.S. PATENT DOCUMENTS

| | | | | |
|---|---|---|---|---|
| 5,373,305 A * | 12/1994 | Lepore, Jr. | | H01Q 1/002 |
| | | | | 244/121 |
| 5,598,989 A * | 2/1997 | Ross | | B32B 27/06 |
| | | | | 244/117 A |
| 7,252,890 B1 * | 8/2007 | Wong | | B32B 27/36 |
| | | | | 428/458 |
| 8,632,036 B1 * | 1/2014 | Bianca, Jr. | | B64G 1/22 |
| | | | | 244/171.7 |
| 2003/0082332 A1 * | 5/2003 | Hasegawa | | B32B 27/08 |
| | | | | 428/74 |
| 2013/0233516 A1 * | 9/2013 | Aston | | B64G 1/503 |
| | | | | 165/104.21 |
| 2014/0239124 A1 | 8/2014 | Aston et al. | | |
| 2014/0287641 A1 * | 9/2014 | Steiner, III | | B32B 5/26 |
| | | | | 442/223 |

FOREIGN PATENT DOCUMENTS

| | | | |
|---|---|---|---|
| KR | 20130043788 A * | 5/2013 | |
| WO | WO 2007/001354 | 1/2007 | |
| WO | WO 2012/015472 | 2/2012 | |

OTHER PUBLICATIONS

European Patent Office, Extended European Search Report for related European patent application EP 15 19 6463, dated Apr. 22, 2016.

Machine-generated English translation of the abstract for KR 2013-0043788, downloaded from Espacenet.com on Apr. 27, 2016.

* cited by examiner

SPACECRAFT AND SPACECRAFT PROTECTIVE BLANKETS

GOVERNMENT RIGHTS

This invention was made with government support under contract number NR0000-12-C-0368 awarded by the National Reconnaissance Office. The government has certain rights in the invention.

FIELD

The present disclosure relates to spacecraft and protective blankets for use on spacecraft.

BACKGROUND

The costs associated with placing spacecraft (e.g., satellites) in orbit are astronomical. For example, in 2014, typical launch costs may be 10's of thousands of U.S. dollars per kilogram of mass, which includes the mass of the launch vehicle and fuel, as well as the mass of the spacecraft being placed in orbit by the launch vehicle. Spacecraft, once in orbit around the Earth or beyond an Earth orbit, are subject to collisions with space debris, both man-made and naturally occurring. Moreover, the payloads of spacecraft typically include electronic equipment, which may be vulnerable to electromagnetic interference (EMI). Accordingly, there is a need to reduce the mass of spacecraft, while at the same time ensuring adequate protection of spacecraft against space debris and ensuring adequate protection of electronic equipment from EMI.

SUMMARY

Protective blankets for spacecraft, methods of assembling protective blankets, spacecraft, and methods of assembling spacecraft are disclosed herein. Protective blankets include a plurality of sheets of material operatively coupled together to define the protective blanket. The plurality of sheets includes at least one sheet composed of carbon nanotube reinforced composite material and at least one sheet composed of a different material. Some protective blankets include at least one sheet composed at least in part of polyaramid or polyimide material. Some protective blankets include at least one sheet of carbon filled composite material. Some protective blankets include at least one sheet composed of metal mesh. Methods of assembling protective blankets include layering the plurality of sheets and operatively coupling together the plurality of sheets. Spacecraft include a body and a protective blanket operatively coupled to the body. Methods of assembling spacecraft include coupling a protective blanket to the body of a spacecraft.

DESCRIPTION

Protective blankets for spacecraft, methods of assembling protective blankets, spacecraft, and methods of assembling spacecraft are disclosed herein. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Figure 1:
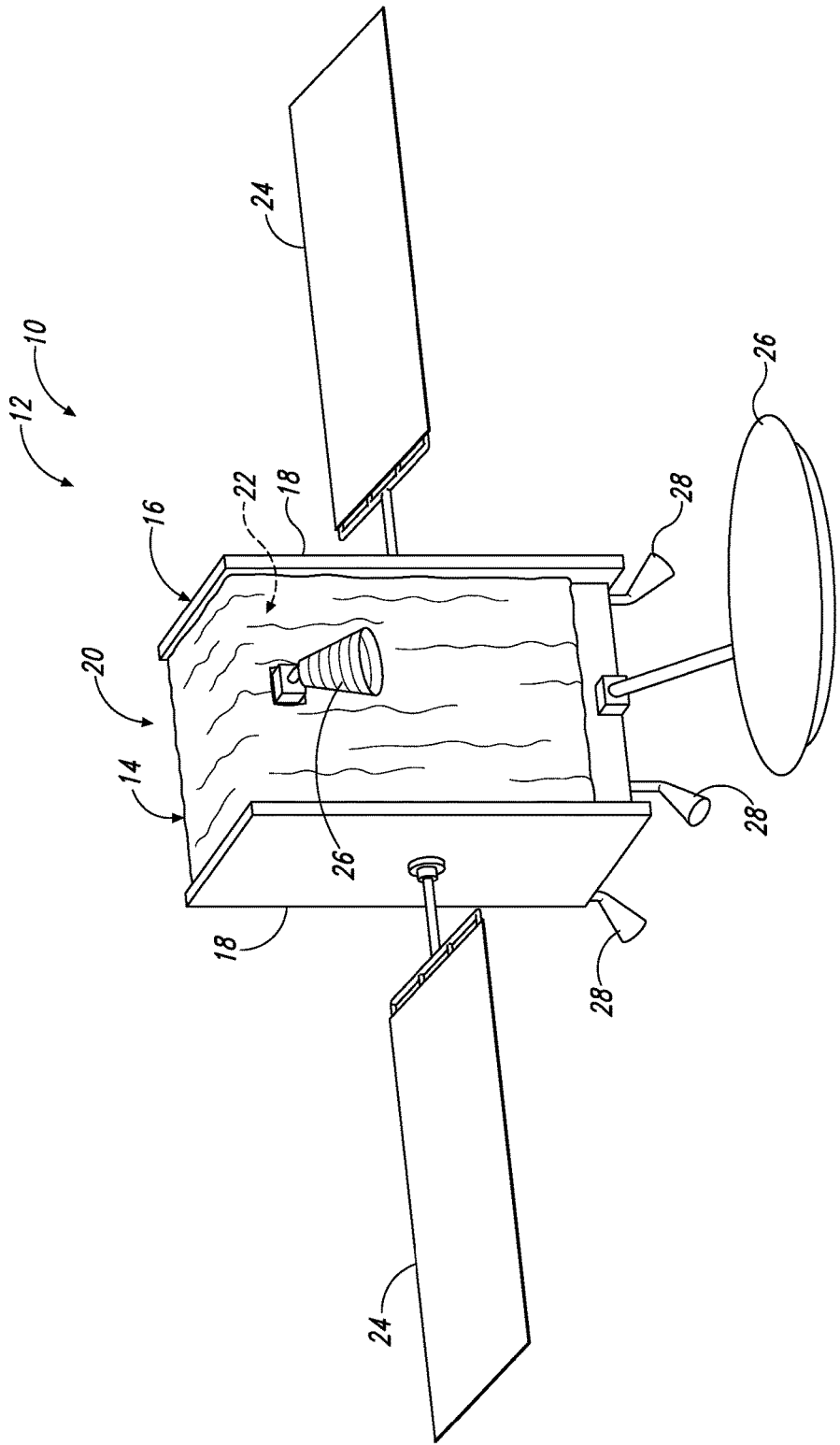
FIG. 1 is an isometric view of an example spacecraft including a protective blanket according to the present disclosure.

FIG. 1 illustrates an example spacecraft 10 in the form of a satellite 12 that includes a protective blanket 14. However, other types of spacecraft 10 are within the scope of the present disclosure, and protective blankets 14 are not limited to being used with satellites, let alone the example satellite 12 illustrated in FIG. 1 and described herein. Spacecraft 10, and therefore satellites 12, include a body 16 and a protective blanket 14 operatively coupled to the body 16. In some examples, the body 16 may be described as a rigid body 16 and may include external appendages. In the illustrated example of satellite 12, the body includes two spaced-apart radiator panels 18 that define a volume 20 between the two spaced-apart radiator panels 18. Examples of spacecraft bodies 16 that may be used with protective blankets 14 are disclosed in U.S. Patent Application Publication No. 2014/0239124, the disclosure of which is incorporated herein by reference.

Protective blankets 14 may be described as flexible protective blankets 14, in so far as they are configured to be wrapped around rigid, or other, structure of a spacecraft 10, and thus to selectively and generally conform to an underlying structure or structure to which the protective blanket is operatively attached. When used with a satellite 12, as illustrated in FIG. 1, the protective blanket 14 may extend at least partially around and at least partially encloses the volume 20 defined between the two spaced-apart radiator panels 18, and may be operatively coupled to the body 16. Typically, the volume 20 of a satellite 12 will include payload 22, such as electronic equipment, communications equipment, power equipment, and/or other equipment, optionally mounted to the inner sides of the radiator panels 18. Protective blankets 14 additionally or alternatively may be wrapped around external appendages of a spacecraft 10. Protective blankets 14 provide thermal protection for the payload and also protect the payload from space-debris and electromagnetic interference (EMI). That is, protective blankets 14 are configured to provide at least three protective features—thermal protection, ballistic protection, and EMI protection. As illustrated in FIG. 1, a satellite 12 also may include external equipment, such as solar panels 24, communication devices 26, thrusters 28, and/or other equipment, mounted to the satellite body 16.

Figure 2:
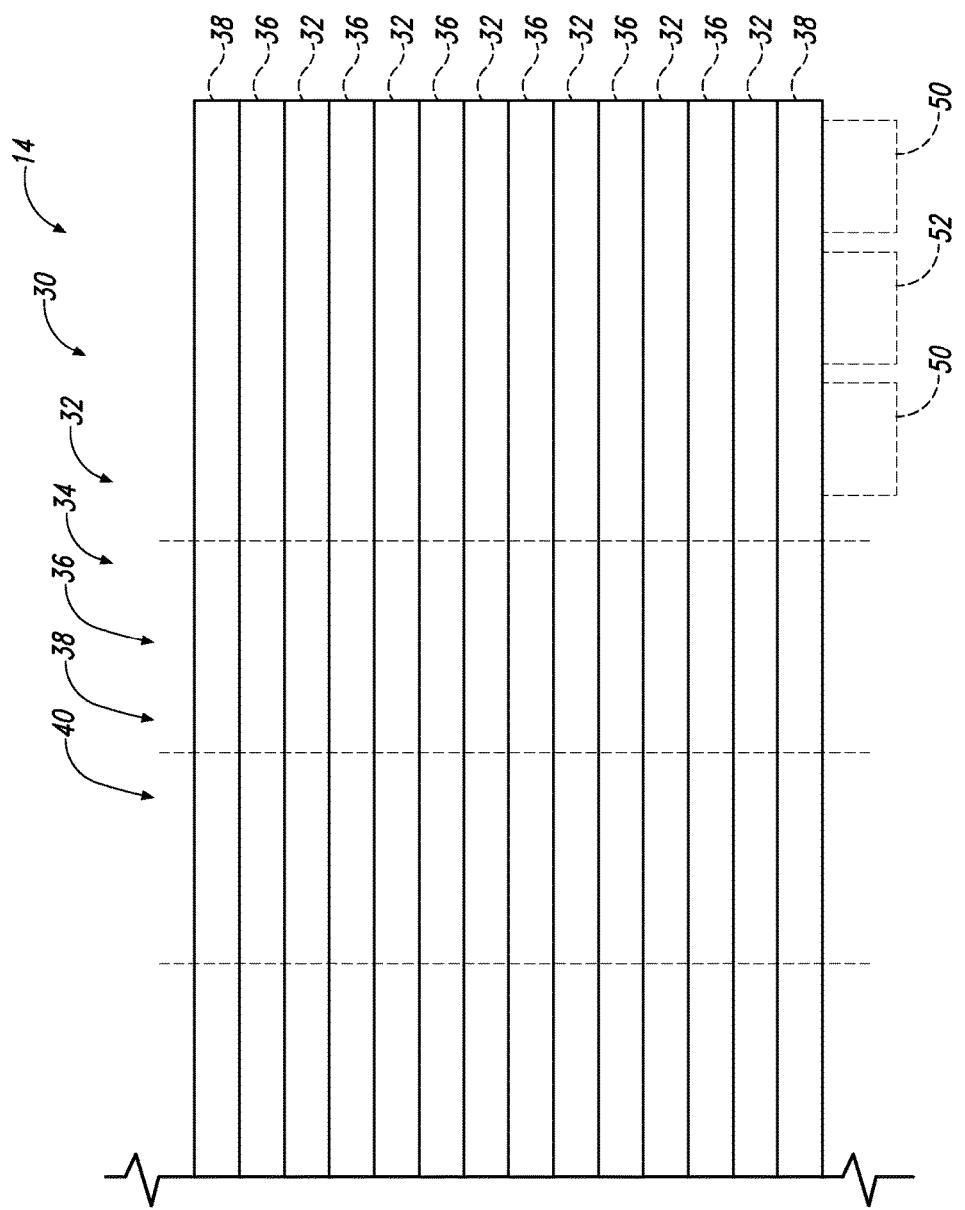
FIG. 2 is a schematic representation of protective blankets according to the present disclosure.

FIG. 2 schematically represents example protective blankets 14. Protective blankets 14 include a plurality of sheets 30 of material that are operatively coupled together to define the protective blanket 14. In FIG. 2, protective blanket 14 is schematically illustrated with fourteen sheets 30 of material; however, protective blankets 14 are not limited to having fourteen sheets 30, and protective blankets may include any suitable number of sheets 30, including fewer than fourteen sheets 30 and greater than fourteen sheets 30.

The plurality of sheets 30 includes at least one sheet 32 that is composed of carbon nanotube reinforced composite material and a least one sheet 34 that is composed of a different material, that is, of a material that is not a carbon nanotube reinforced composite material. As used herein, a "reinforced composite material" refers to materials that include a matrix or binder material (such as a polymer, polyester, silicone, or epoxy binder) together with a filler.

The filler may be fibers, particulates, or other configurations of material depending on the desired properties of the reinforced composite material and thus the desired properties of the corresponding sheet 30. Moreover, the filler may be ordered, such as woven fibers or longitudinally aligned fibers, or the filler may be disordered, such as randomly ordered. Accordingly, a carbon nanotube reinforced composite material is a material that includes a matrix with a carbon nanotube filler.

Any suitable number and configurations of sheets 32 that are composed of carbon nanotube composite material may be incorporated into a protective blanket 14. For example, a protective blanket 14 may include 2, 3, 4, 5, 6, 7, 8, 9, 10, 2-10, 2-8, 2-6, 2-4, 4-10, 4-8, 4-6, 6-10, 6-8, 8-10, at least 2, at least 4, at least 6, at least 8, or at least 10 sheets 32 composed of carbon nanotube reinforced composite material. A sheet 32 may have a thickness in the range of 10-100, 10-80, 10-60, 10-40, 10-30, 10-20, 20-100, 20-80, 20-60, 20-40, 20-30, 30-100, 30-80, 30-60, 30-40, 40-100, 40-80, 40-60, 60-100, 60-80, or 80-100 µm. The carbon nanotube reinforced composite material of a sheet 32 may include one or more of chopped carbon nanotube fibers, carbon nanotubes in yarn or chain form, carbon discontinuous carbon nanotubes, carbon nanotubes with an ordered orientation, carbon nanotubes with an unordered, or random, orientation, carbon nanotubes with lengths in the range of 10 µm-10 mm, and/or carbon nanotubes with diameters in the range of 1-5 µm. The carbon nanotube reinforced composite material of a sheet 32 may include one or more of a low modulus flexible epoxy resin matrix, a silicone based binder, polyester based binder, an epoxy matrix, or a cyanate ester matrix. In other examples, a sheet 32 may include carbon nanotubes without a matrix or binder.

As mentioned, protective blankets 14 include at least one sheet 34 that is composed of a material other than carbon nanotube reinforced composite material. For example, a protective blanket 14 may include at least one sheet 36 that is composed at least in part of a polyaramid material and/or a polyimide material. Any suitable number and configurations of sheets 36 may be incorporated into a protective blanket 14. In some examples, one or more sheets 36 may include a fabric of woven polyaramid and/or polyimide reinforced composite material. Additionally or alternatively, one or more sheets 36 may be composed of polyaramid and/or polyimide reinforced composite material, such as that includes polyaramid and/or polyimide fibers and a binding material. A protective blanket 14 may include 2, 3, 4, 5, 6, 7, 8, 9, 10, 2-10, 2-8, 2-6, 2-4, 4-10, 4-8, 4-6, 6-10, 6-8, 8-10, at least 2, at least 4, at least 6, at least 8, or at least 10 sheets 36 composed at least in part of polyaramid and/or polyimide material. A sheet 36 may have a thickness in the range of 10-100, 10-80, 10-60, 10-40, 10-30, 10-20, 20-100, 20-80, 20-60, 20-40, 20-30, 30-100, 30-80, 30-60, 30-40, 40-100, 40-80, 40-60, 60-100, 60-80, or 80-100 µm. The polyaramid and/or polyimide material of a sheet 30 may include KEVLAR™ material and/or NOMEX™ material, for example. When a sheet 36 is composed of a polyaramid and/or polyimide reinforced composite material, the polyaramid and/or polyimide reinforced composite material may include a polyester binding, for example.

Additionally or alternatively, a protective blanket 14 may include at least one sheet 38 that is composed of carbon filled composite material. Any suitable number and configurations of sheets 38 may be incorporated into a protective blanket 14. For example, a protective blanket may include 2, 3, 4, 5, 6, 7, 8, 9, 10, 2-10, 2-8, 2-6, 2-4, 4-10, 4-8, 4-6, 6-10, 6-8, 8-10, at least 2, at least 4, at least 6, at least 8, or at least 10 sheets 38 composed of carbon filled composite material. A sheet 38 may have a thickness in the range of 10-100, 10-80, 10-60, 10-40, 10-30, 10-20, 20-100, 20-80, 20-60, 20-40, 20-30, 30-100, 30-80, 30-60, 30-40, 40-100, 40-80, 40-60, 60-100, 60-80, or 80-100 µm. The carbon filled composite material of a sheet 38 may include a carbon fiber filled polyimide and/or a carbon fiber loaded KAPTON™ material. In some protective blankets 14, sheets 38 may define the outer layers of the plurality of sheets 30.

Additionally or alternatively, a protective blanket may include at least one sheet 40 that is composed of metal mesh. Any suitable number and configurations of sheets 40 may be incorporated into a protective blanket 14. For example, a protective blanket may include 2, 3, 4, 5, 6, 7, 8, 9, 10, 2-10, 2-8, 2-6, 2-4, 4-10, 4-8, 4-6, 6-10, 6-8, 8-10, at least 2, at least 4, at least 6, at least 8, or at least 10 sheets 40 composed of metal mesh. A sheet 40 may have a thickness in the range of 10-100, 10-80, 10-60, 10-40, 10-30, 10-20, 20-100, 20-80, 20-60, 20-40, 20-30, 30-100, 30-80, 30-60, 30-40, 40-100, 40-80, 40-60, 60-100, 60-80, or 80-100 µm. The metal mesh of a sheet 40 may include aluminum and/or copper, for example. The metal mesh of a sheet 40 may include pores having a maximum dimension in the range of 1-10 mm, for example. The metal mesh of a sheet 40 may include pores that are spaced apart in the range of 1-10 mm, for example.

As mentioned, any suitable number of sheets 30, sheets 32, and sheets 34 may be incorporated into a protective blanket 14, for example, depending on the desired properties of and application for the protective blanket 14. In some examples, more than one sheet of a particular configuration may be positioned directly together, that is, with two or more sheets composed of the same material being stacked together. Additionally or alternatively, in some examples, one configuration of sheet may be interleaved with another configuration of sheet, that is, with two configurations of sheets being stacked together in an alternating fashion. Additionally or alternatively, in some examples, more than two configurations of sheets may be stacked in an alternating fashion, including the sequential stacking of three, four, or more than four sheets composed of different materials. Additionally or alternatively, one particular configuration of a sheet may be stacked as an outer layer of a protective blanket 14. Additionally or alternatively, one particular configuration of a sheet may be stacked as both outer layers of a protective blanket 14, that is, defining both outermost layers of the protective blanket 14. Other configurations of stacking sheets 30 also are within the scope of the present disclosure, and protective blankets 14 are not limited to the specific examples described herein.

In FIG. 2, the schematically illustrated fourteen sheets 30 represent one example of a protective blanket 14, with the dashed lead lines on the right side of the figure identifying an optional order of sheets 30. Specifically, as indicated, an example protective blanket may include six sheets 32 of composed of carbon nanotube reinforced composite material interleaved with six sheets 36 composed at least in part of polyaramid material, and with two sheets 38 composed of carbon filled composite material defining the outer layers of the protective blanket.

The sheets 30 of a protective blanket 14 may be coupled together in any suitable fashion to define the protective blanket 14. In some examples, such as schematically represented by the vertical dashed lines in FIG. 2, the sheets 30 may be coupled together at spaced-apart points across the protective blanket. For example, the sheets 30 may be coupled together by stitching, sewing, tacking, or otherwise fastening the sheets together, such as with fiberglass and/or nylon thread, with pressure sensitive adhesive, and/or with hook and pile fasteners (e.g., VELCRO™). Alternatively, the sheets 30 of a protective blanket may be coupled together only at their perimeters. Additionally or alternatively, one or more of the sheets 30, including optionally all of the sheets 30, may be co-laminated or otherwise adhered together across their entireties, or substantially across their entireties. Other examples of coupling together a plurality of sheets 30 to form a protective blanket 14 also are within the scope of the present disclosure.

As schematically and optionally illustrated in FIG. 2, some examples of protective blankets 14 also include one or more attachment mechanisms operatively coupled to an outer one of the sheets 30. When present, an attachment mechanism may be configured to operatively couple the protective blanket 14 to a body 16 of a spacecraft 10. For example, an attachment mechanism 50 may include a hook and pile fastener that extends adjacent at least a portion of, optionally substantially all of, optionally all of, a perimeter of one side of the protective blanket 14. In some examples, as schematically and optionally illustrated in FIG. 2, two spaced-apart attachment mechanisms 50, optionally in the form of hook and pile fasteners, may extend adjacent at least a portion of, optionally substantially all of, optionally all of, a perimeter of one side of the protective blanket 14.

Additionally or alternatively, as also schematically and optionally illustrated in FIG. 2, a protective blanket 14 may include a sealing mechanism 52 that is operatively coupled to an outer one of the sheets 30. When present, a sealing mechanism 52 may be configured to operatively seal against a body 16 of a spacecraft 10. For example, a sealing mechanism 52 may include or be in the form of one or more of a gasket, an O-ring, an adhesive, etc. that extends adjacent at least a portion of, optionally substantially all of, optionally all of, a perimeter of one side of the protective blanket 14. In some examples, as schematically and optionally illustrated in FIG. 2, a sealing mechanism 52 may be positioned between two spaced-apart portions of a hook and pile fastener around the perimeter of one side of a protective blanket 14.

Figure 3:
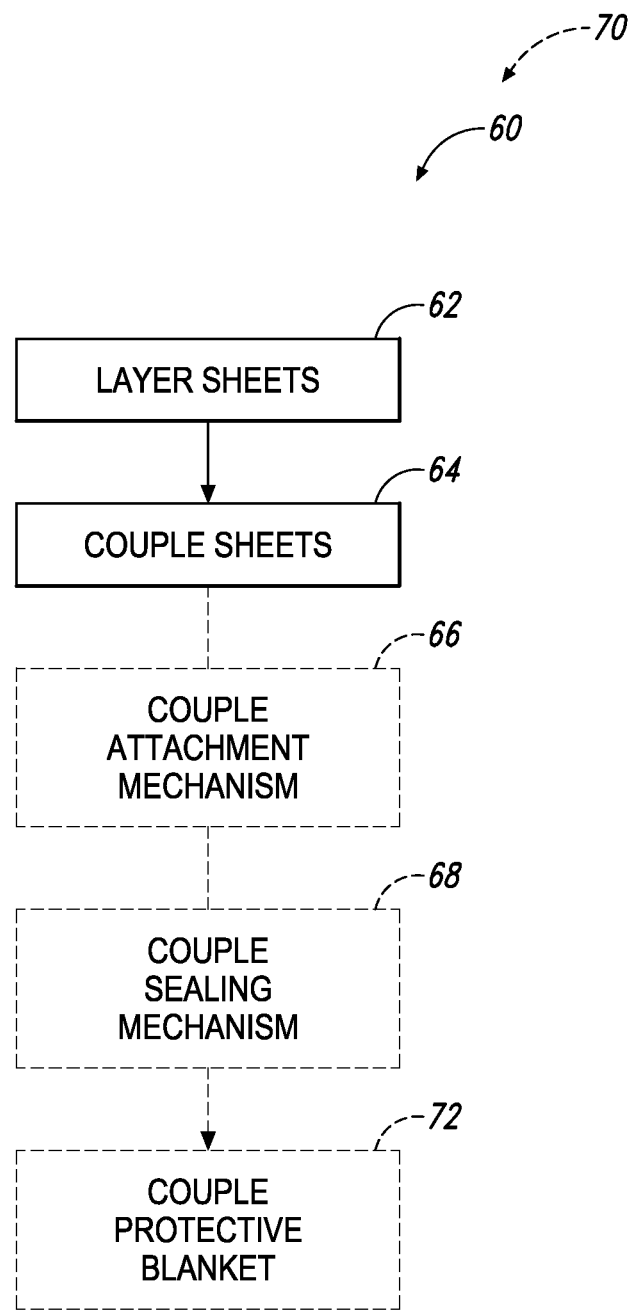
FIG. 3 is a flowchart schematically representing methods according to the present disclosure.

FIG. 3 schematically provides a flowchart that represents illustrative, non-exclusive examples of methods according to the present disclosure. In FIG. 3, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 3 are not limiting and other methods and steps are within the scope of the present disclosure, including methods having greater than or fewer than the number of steps illustrated, as understood from the discussions herein.

As schematically illustrated in solid boxes in FIG. 3, methods 60 of assembling a protective blanket 14 may include layering, or stacking, a plurality of sheets 30, as indicated at 62, and operatively coupling together the sheets 30, as indicated at 64. In some examples, the operatively coupling together 64 may include coupling together the sheets 30 at spaced-apart points across the protective blanket 14. In some such examples, the sheets are sewn, stitched, tacked, or otherwise fastened together around the edges of the protective blanket 14 and/or at spaced-apart intervals across the span of the protective blanket 14, such as with fiberglass or nylon thread, with pressure sensitive adhesive, and/or with hook and pile fasteners (e.g., VELCRO™).

As schematically and optionally illustrated in FIG. 3 at 66, a method 60 additionally may include coupling an attachment mechanism 50 to an outer one of the sheets 30, with the attachment mechanism 50 being configured to operatively couple the protective blanket 14 to a body 16 of a spacecraft 10.

As also schematically and optionally illustrated in FIG. 3 at 68, a method 60 additionally or alternatively may include coupling a sealing mechanism 52 to an outer one of the sheets 30, with the sealing mechanism 52 being configured to operatively seal against a body 16 of a spacecraft 10.

Methods 70 of assembling a spacecraft 10 also are within the scope of the present disclosure, and as indicated in FIG. 3 at 72 may include at least coupling a protective blanket 14 to a body 16 of a spacecraft 10. Some methods 70 also may include performing a method 60 of assembling the protective blanket 14 prior to the operatively coupling 72.

Illustrative, non-exclusive examples of inventive subject matter according to the present disclosure are described in the following enumerated paragraphs:

A. A protective blanket for a spacecraft, the protective blanket comprising:

a plurality of sheets of material operatively coupled together to define the protective blanket, wherein the plurality of sheets includes at least one sheet composed of carbon nanotube reinforced composite material and at least one sheet composed of a different material.

A1. The protective blanket of paragraph A, wherein the at least one sheet composed of carbon nanotube reinforced composite material includes 2, 3, 4, 5, 6, 7, 8, 9, 10, 2-10, 2-8, 2-6, 2-4, 4-10, 4-8, 4-6, 6-10, 6-8, 8-10, at least 2, at least 4, at least 6, at least 8, or at least 10 sheets composed of carbon nanotube reinforced composite material.

A2. The protective blanket of any of paragraphs A-A1, wherein the at least one sheet composed of carbon nanotube reinforced composite material has a thickness in the range of 10-100, 10-80, 10-60, 10-40, 10-30, 10-20, 20-100, 20-80, 20-60, 20-40, 20-30, 30-100, 30-80, 30-60, 30-40, 40-100, 40-80, 40-60, 60-100, 60-80, or 80-100 μm.

A3. The protective blanket of any of paragraphs A-A2, wherein the carbon nanotube reinforced composite material includes, optionally consists of, optionally consists essentially of, one or more of chopped carbon nanotube fibers, carbon nanotubes in yarn or chain form, carbon discontinuous carbon nanotubes, carbon nanotubes with an ordered orientation, carbon nanotubes with an unordered, or random, orientation, carbon nanotubes with lengths in the range of 10 μm-10 mm, and/or carbon nanotubes with diameters in the range of 1-5 μm.

A4. The protective blanket of any of paragraphs A-A3, wherein the carbon nanotube reinforced composite material includes, optionally consists of, optionally consists essentially of, one or more of a low modulus flexible epoxy resin matrix, a silicone based binder, polyester based binder, an epoxy matrix, or a cyanate ester matrix.

A5. The protective blanket of any of paragraphs A-A4, wherein the plurality of sheets further includes at least one sheet composed at least in part of a polyaramid material and/or a polyimide, optionally a polyaramid and/or polyimide reinforced composite material.

A5.1. The protective blanket of paragraph A5, wherein the at least one sheet composed at least in part of a polyaramid material and/or a polyimide material includes a fabric of woven polyaramid and/or polyimide material.

A5.2. The protective blanket of any of paragraphs A5-A5.1, wherein the at least one sheet composed at least in part of a polyaramid material and/or a polyimide material includes 2, 3, 4, 5, 6, 7, 8, 9, 10, 2-10, 2-8, 2-6, 2-4, 4-10, 4-8, 4-6, 6-10, 6-8, 8-10, at least 2, at least 4, at least 6, at least 8, or at least 10 sheets composed at least in part of a polyaramid material and/or a polyimide material.

A5.3. The protective blanket of any of paragraphs A5-A5.2, wherein the at least one sheet composed at least in part of a polyaramid material and/or a polyimide material has a thickness in the range of 10-100, 10-80, 10-60, 10-40, 10-30, 10-20, 20-100, 20-80, 20-60, 20-40, 20-30, 30-100, 30-80, 30-60, 30-40, 40-100, 40-80, 40-60, 60-100, 60-80, or 80-100 µm.

A5.4. The protective blanket of any of paragraphs A5-A5.3, wherein the polyaramid and/or polyimide material includes, optionally consists of, optionally consists essentially of, KEVLAR™ material and/or NOMEX™ material.

A5.5. The protective blanket of any of paragraphs A5-A5.4, wherein the polyaramid and/or polyimide reinforced composite material includes, optionally consists of, optionally consists essentially of, a polyester binding.

A6. The protective blanket of any of paragraphs A-A5.5, wherein the plurality of sheets further includes at least one sheet composed of carbon filled composite material.

A6.1. The protective blanket of paragraph A6, wherein the at least one sheet composed of carbon filled composite material includes 2, 3, 4, 5, 6, 7, 8, 9, 10, 2-10, 2-8, 2-6, 2-4, 4-10, 4-8, 4-6, 6-10, 6-8, 8-10, at least 2, at least 4, at least 6, at least 8, or at least 10 sheets composed of carbon filled composite material.

A6.2. The protective blanket of any of paragraphs A6-A6.1, wherein the at least one sheet composed of carbon filled composite material has a thickness in the range of 10-100, 10-80, 10-60, 10-40, 10-30, 10-20, 20-100, 20-80, 20-60, 20-40, 20-30, 30-100, 30-80, 30-60, 30-40, 40-100, 40-80, 40-60, 60-100, 60-80, or 80-100 µm.

A6.3. The protective blanket of any of paragraphs A6-A6.2, wherein the carbon filled composite material includes, optionally consists of, optionally consists essentially of, carbon fiber filled polyimide and/or a carbon fiber loaded KAPTON™ material.

A6.4. The protective blanket of any of paragraphs A6-A6.3, wherein the at least one sheet composed of carbon filled composite material defines outer layers of the plurality of sheets.

A7. The protective blanket of any of paragraphs A-A6.4, wherein the plurality of sheets further includes at least one sheet composed of metal mesh.

A7.1. The protective blanket of paragraph A7, wherein the at least one sheet composed of metal mesh includes 2, 3, 4, 5, 6, 7, 8, 9, 10, 2-10, 2-8, 2-6, 2-4, 4-10, 4-8, 4-6, 6-10, 6-8, 8-10, at least 2, at least 4, at least 6, at least 8, or at least 10 sheets composed of metal mesh.

A7.2. The protective blanket of any of paragraphs A7-A7.1, wherein the at least one sheet composed of metal mesh has a thickness in the range of 10-100, 10-80, 10-60, 10-40, 10-30, 10-20, 20-100, 20-80, 20-60, 20-40, 20-30, 30-100, 30-80, 30-60, 30-40, 40-100, 40-80, 40-60, 60-100, 60-80, or 80-100 µm.

A7.3. The protective blanket of any of paragraphs A7-A7.2, wherein the metal mesh includes, optionally consists of, optionally consists essentially of, aluminum and/or copper.

A7.4. The protective blanket of any of paragraphs A7-A7.3, wherein the metal mesh includes, optionally consists of, optionally consists essentially of, pores having a maximum dimension in the range of 1-10 mm.

A7.5. The protective blanket of any of paragraphs A7-A7.4, wherein the metal mesh includes, optionally consists of, optionally consists essentially of, pores that are spaced apart in the range of 1-10 mm.

A8. The protective blanket of any of paragraphs A-A7.5, wherein the plurality of sheets includes 2-10, optionally 6, sheets composed of carbon nanotube reinforced composite material interleaved with 2-10, optionally 6, sheets composed at least in part of polyaramid and/or polyimide material.

A9. The protective blanket of any of paragraphs A-A8, wherein the plurality of sheets includes layered in order:
a first sheet composed of carbon filled composite material;
a first sheet composed at least in part of polyaramid and/or polyimide material;
a first sheet composed of carbon nanotube reinforced composite material;
a second sheet composed at least in part of polyaramid and/or polyimide material;
a second sheet composed of carbon nanotube reinforced composite material;
a third sheet composed at least in part of polyaramid and/or polyimide material;
a third sheet composed of carbon nanotube reinforced composite material;
a fourth sheet composed at least in part of polyaramid and/or polyimide material;
a fourth sheet composed of carbon nanotube reinforced composite material;
a fifth sheet composed at least in part of polyaramid and/or polyimide material;
a fifth sheet composed of carbon nanotube reinforced composite material;
a sixth sheet composed at least in part of polyaramid and/or polyimide material;
a sixth sheet composed of carbon nanotube reinforced composite material; and
a second sheet composed of carbon filled composite material.

A10. The protective blanket of any of paragraphs A-A9, wherein the plurality of sheets of material is coupled together at spaced-apart points across the protective blanket.

A11. The protective blanket of any of paragraphs A-A10, further comprising:
an attachment mechanism operatively coupled to an outer one of the plurality of sheets, wherein the attachment mechanism is configured to operatively couple the protective blanket to a body of a spacecraft.

A11.1. The protective blanket of paragraph A11, wherein the attachment mechanism includes a hook and pile fastener extending adjacent at least a portion of, optionally substantially all of, optionally all of, a perimeter of one side of the protective blanket.

A12. The protective blanket of any of paragraphs A-A11.1, further comprising:
a sealing mechanism operatively coupled to an/the outer one of the plurality of sheets, wherein the sealing mechanism is configured to operatively seal against a/the body of a/the spacecraft.

A12.1. The protective blanket of paragraph A12, wherein the sealing mechanism includes a gasket extending adjacent at least a portion of, optionally substantially all of, optionally all of, a/the perimeter of one side of the protective blanket.

A12.1.1. The protective blanket of paragraph A12.1 when depending from paragraph A11.1, wherein the hook and pile fastener includes two spaced-apart portions, and wherein the gasket is positioned between the two spaced-apart portions.

A13. The use of the protective blanket of any of paragraphs A-A12.1.1, optionally for protecting a spacecraft.

A14. A spacecraft, comprising:
a body; and
the protective blanket of any of paragraphs A-A12.1.1 operatively coupled to the body.

A14.1. The spacecraft of paragraph A14, wherein the body includes two spaced-apart radiator panels, and wherein the protective blanket extends at least partially around and at least partially encloses a volume between the two spaced-apart radiator panels.

A14.2. The spacecraft of any of paragraphs A14-A14.1, wherein the body includes an external appendage, and wherein the protective blanket is wrapped around the external appendage.

B. A method of assembling the protective blanket of any of paragraphs A-A12.1.1, the method comprising:
layering the plurality of sheets; and
operatively coupling together the plurality of sheets.

B1. The method of paragraph B, wherein the operatively coupling together includes coupling together at spaced-apart points across the protective blanket.

B1.1. The method of paragraph B1, wherein stitching, sewing, tacking, or otherwise fastening the sheets together, such as with fiberglass and/or nylon thread, with pressure sensitive adhesive, and/or with hook and pile fasteners.

B2. The method of any of paragraphs B-B1.1, further comprising:
coupling an attachment mechanism to an outer one of the plurality of sheets, wherein the attachment mechanism is configured to operatively couple the protective blanket to a body of a spacecraft.

B3. The method of any of paragraphs B-B2, further comprising:
coupling a sealing mechanism to an/the outer one of the plurality of sheets, wherein the sealing mechanism is configured to operatively seal against a/the body of a/the spacecraft.

C. A method of assembling a spacecraft, the method comprising:
coupling the protective blanket of any of paragraphs A-A12.1.1 to a/the body of the spacecraft.

C1. The method of paragraph C, further comprising:
prior to the operatively coupling the protective blanket, performing the method of any of paragraphs B-B3.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A flexible protective blanket for a spacecraft, the flexible protective blanket comprising:
a plurality of flexible sheets of material operatively coupled together to define the flexible protective blanket, wherein the plurality of flexible sheets includes at least one sheet consisting essentially of carbon nanotubes and at least one sheet composed of a different material, wherein the at least one sheet consisting essentially of carbon nanotubes is without a matrix or binder, and wherein each sheet of the plurality of flexible sheets substantially spans the flexible protective blanket.

2. The flexible protective blanket of claim 1, wherein the at least one sheet consisting essentially of carbon nanotubes includes 2-10 sheets consisting essentially of carbon nanotubes.

3. The flexible protective blanket of claim 1, wherein the at least one sheet consisting essentially of carbon nanotubes has a thickness in the range of 10-100 μm.

4. The flexible protective blanket of claim 1, wherein the plurality of flexible sheets further includes at least one sheet composed at least in part of polyaramid or polyimide material.

5. The flexible protective blanket of claim 1, wherein the plurality of flexible sheets further includes at least one sheet composed of carbon filled composite material.

6. The flexible protective blanket of claim 5, wherein the at least one sheet composed of carbon filled composite material defines outer layers of the plurality of flexible sheets.

7. The flexible protective blanket of claim 1, wherein the plurality of flexible sheets further includes at least one sheet composed of metal mesh.

8. The flexible protective blanket of claim 1, wherein the plurality of flexible sheets includes 2-10 sheets consisting essentially of carbon nanotubes interleaved with 2-10 sheets composed at least in part of polyaramid or polyimide material.

9. The flexible protective blanket of claim 1, wherein the plurality of flexible sheets includes layered in order:
a first sheet composed of carbon filled composite material;
a first sheet composed at least in part of polyaramid or polyimide material;
a first sheet consisting essentially of carbon nanotubes;
a second sheet composed at least in part of polyaramid or polyimide material;
a second sheet consisting essentially of carbon nanotubes;
a third sheet composed at least in part of polyaramid or polyimide material;
a third sheet consisting essentially of carbon nanotubes;
a fourth sheet composed at least in part of polyaramid or polyimide material;
a fourth sheet consisting essentially of carbon nanotubes;
a fifth sheet composed at least in part of polyaramid or polyimide material;
a fifth sheet consisting essentially of carbon nanotubes;

a sixth sheet composed at least in part of polyaramid or polyimide material;

a sixth sheet consisting essentially of carbon nanotubes; and a second sheet composed of carbon filled composite material.

10. The flexible protective blanket of claim 1, further comprising:

an attachment mechanism operatively coupled to an outer one of the plurality of flexible sheets, wherein the attachment mechanism is configured to operatively couple the flexible protective blanket to a body of the spacecraft.

11. The flexible protective blanket of claim 10, wherein the attachment mechanism includes a hook and pile fastener extending adjacent substantially all of a perimeter of one side of the flexible protective blanket.

12. The flexible protective blanket of claim 11, further comprising:

a gasket operatively coupled to the outer one of the plurality of flexible sheets, wherein the gasket is configured to operatively seal against the body of the spacecraft, and wherein the gasket extends adjacent substantially all of the perimeter of the one side of the protective blanket;

wherein the hook and pile fastener includes two spaced-apart portions, and wherein the gasket is positioned between the two spaced-apart portions.

13. A spacecraft, comprising:

a body; and the flexible protective blanket of claim 1 operatively coupled to the body.

14. The spacecraft of claim 13, wherein the body includes two spaced-apart radiator panels, wherein the flexible protective blanket extends at least partially around and at least partially encloses a volume between the two spaced-apart radiator panels.

15. A method of assembling the flexible protective blanket of claim 1, the method comprising:

layering the plurality of flexible sheets; and operatively coupling together the plurality of flexible sheets at spaced-apart points across the flexible protective blanket.

16. The method of claim 15, further comprising:

coupling an attachment mechanism to an outer one of the plurality of flexible sheets, wherein the attachment mechanism is configured to operatively couple the flexible protective blanket to a body of a spacecraft.

17. The method of claim 16, further comprising:

coupling a sealing mechanism to the outer one of the plurality of flexible sheets, wherein the sealing mechanism is configured to operatively seal against the body of the spacecraft.

18. A method of assembling a spacecraft, the method comprising:

coupling the flexible protective blanket of claim 1 to a body of a spacecraft.

19. The flexible protective blanket of claim 1, wherein the plurality of sheets of material is coupled together at spaced-apart points across the protective blanket.

20. A protective blanket for a spacecraft, the protective blanket comprising:

a plurality of sheets of material operatively coupled together to define the protective blanket, wherein the plurality of sheets includes layered in order:

a first sheet composed of carbon filled composite material;

a first sheet composed at least in part of polyaramid or polyimide material;

a first sheet composed of carbon nanotube reinforced composite material;

a second sheet composed at least in part of polyaramid or polyimide material;

a second sheet composed of carbon nanotube reinforced composite material;

a third sheet composed at least in part of polyaramid or polyimide material;

a third sheet composed of carbon nanotube reinforced composite material;

a fourth sheet composed at least in part of polyaramid or polyimide material;

a fourth sheet composed of carbon nanotube reinforced composite material;

a fifth sheet composed at least in part of polyaramid or polyimide material;

a fifth sheet composed of carbon nanotube reinforced composite material;

a sixth sheet composed at least in part of polyaramid or polyimide material;

a sixth sheet composed of carbon nanotube reinforced composite material; and a second sheet composed of carbon filled composite material.

21. A spacecraft, comprising:

a body; and the protective blanket of claim 20 operatively coupled to the body.

22. A method of assembling the protective blanket of claim 20, the method comprising:

layering the plurality of sheets; and operatively coupling together the plurality of sheets at spaced-apart points across the protective blanket.

* * * * *